J. E. JOHNSON.
DRIVE FOR MACHINE TOOLS.
APPLICATION FILED DEC. 21, 1914.

1,153,311.

Patented Sept. 14, 1915.
2 SHEETS—SHEET 1.

Witnesses
Arthur P. Morse
H. A. Sandberg

Inventor
John Emil Johnson
By Arthur Baldwin.
Attorney

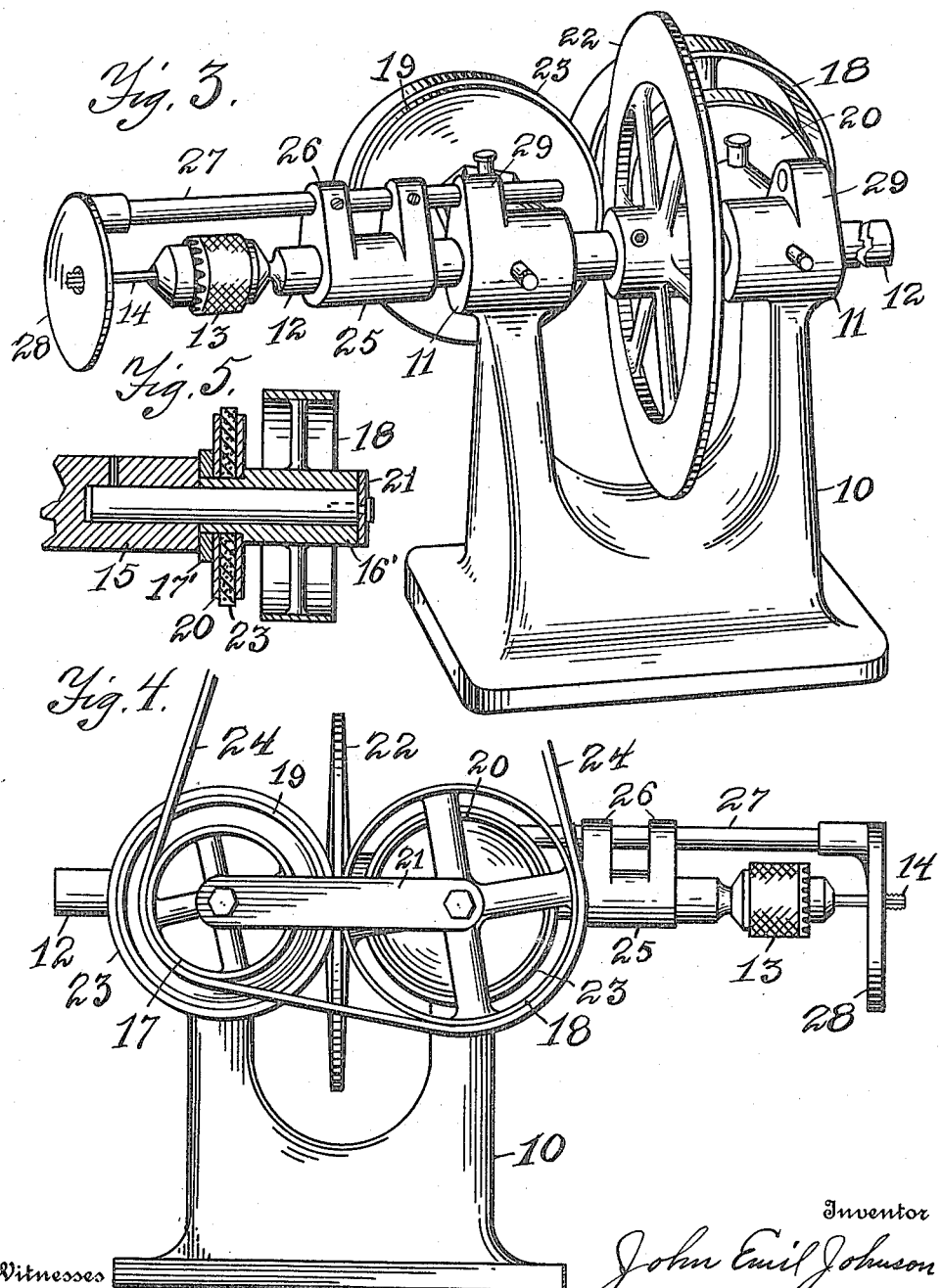

UNITED STATES PATENT OFFICE.

JOHN EMIL JOHNSON, OF JAMESTOWN, NEW YORK, ASSIGNOR TO RICKERT-SHAFER COMPANY, OF ERIE, PENNSYLVANIA.

DRIVE FOR MACHINE-TOOLS.

1,153,311.      Specification of Letters Patent.      Patented Sept. 14, 1915.

Original application filed June 8, 1914, Serial No. 843,661. Divided and this application filed December 21, 1914. Serial No. 878,215.

*To all whom it may concern:*

Be it known that I, JOHN EMIL JOHNSON, a citizen of the United States, residing at the city of Jamestown, in the county of Chautauqua and State of New York, have invented certain new and useful Improvements in Drives for Machine-Tools, of which the following, taken in connection with the accompanying drawings, is a specification.

The invention relates to devices for machines for tapping or cutting interior threads and similar machines in which it is necessary to reverse the direction of rotation of the cutting tool or tap so that it may be rapidly screwed out after the hole has been threaded, and the construction herein claimed is a divisional application from my application Serial No. 843,661, filed June 8, 1914, for a tapping machine; and the object of the improvement is to provide a simple and convenient machine which is positive in its action, adapted for rapid tapping and so arranged that by simply pushing the work toward the machine the cutting tool is caused to revolve and by pulling it from the machine the motion of the cutting tool is reversed and it is rapidly screwed out of the aperture which it has threaded; and the invention consists of the novel features and combinations hereinafter set forth and claimed.

Figure 1:
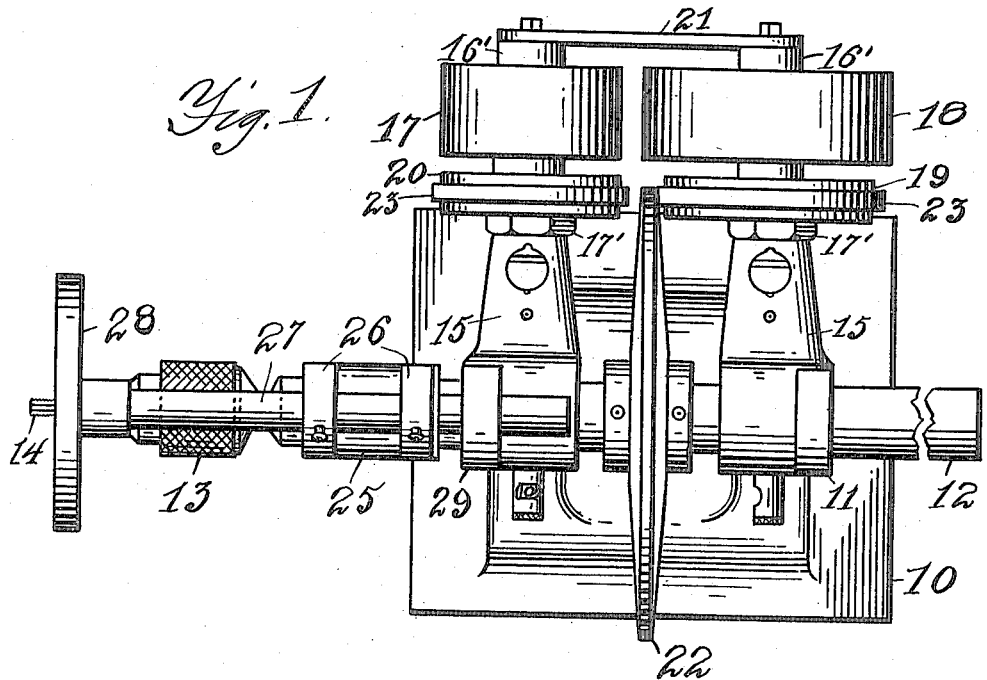
Figure 2:
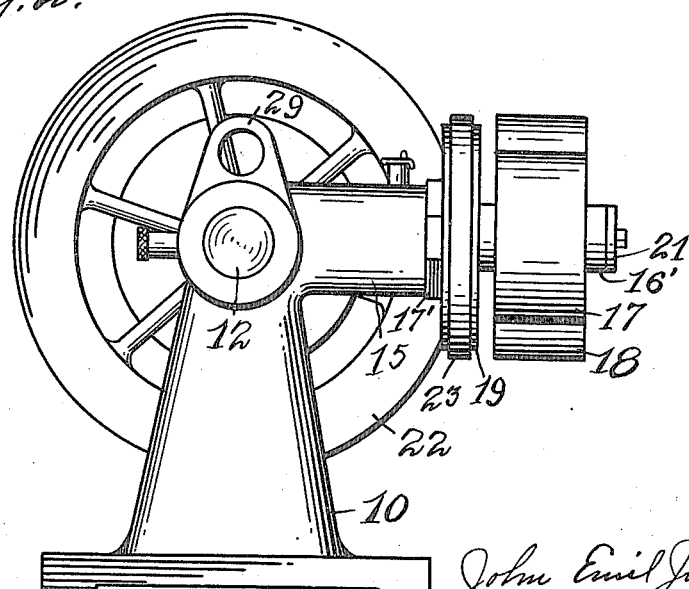

In the drawings, Figure 1 is a plan view of the machine showing the arrangement of the parts; Fig. 2 is an end elevation of the machine; Fig. 3 is a front perspective view; Fig. 4 is a rear elevation of the machine, showing the manner of driving the double pulleys; and Fig. 5 is a lengthwise sectional view of one of the pulleys and hub and frictional drive wheel thereon and a portion of the arm of the frame, showing the shaft support therein.

Like numerals of reference refer to corresponding parts in the several views.

The numeral 10 designates the case or frame which has the two upright supporting journals 11, and has the tool holding clamp 13 attached to one end for removably holding the cutting tool or tap 14.

The frame 10 has the two sidewise projecting arms 15 extending out from the journals 11 within which arms are keyed the shafts 16 upon which the pulleys 17 and 18 and the frictional drive wheels 19 and 20 are revolubly mounted, the outer ends of the two shafts 16 being firmly held in line a spaced distance apart by the connecting plate 21 which is attached to said outer shaft ends by suitable screw-bolts. This arrangement holds the two shafts 16 fixedly attached to the arms 15. The pulleys 17 and 18 have long or extended hubs 16', which are diminished in size on their inner ends to receive the frictional drive wheels 19 and 20, the diminished portion providing a shoulder against which the frictional drive wheels 19 and 20 are firmly held by means of the nuts 17'.

The frictional drive wheels 19 and 20 consist of two disk shaped plates, one for each side of a central frictional disk 23, which disk 23 is preferably made from some strong frictional material, as for example, paper board. The nuts 17' hold the metal plates each side of the frictional disk 23 firmly in line, and the shoulder on the hub 16' holds both of the frictional drive wheels 19 and 20 a spaced distance from the pulleys 17 and 18. This manner of attaching the frictional drive wheels 19 and 20 firmly upon the hubs 16' causes said frictional drive wheels to turn with said pulley hubs of the pulleys 17 and 18.

The peripheries of the pulleys 17 and 18 and frictional drive wheels 19 and 20 are placed a spaced distance apart. A frictional drive wheel 22 is keyed on the shaft 12 between the journals 11 to rotate with said shaft and extends out into the space between the frictional drive wheels 19 and 20 so that pressure of the frictional drive wheel 22 against one of said drive wheels 19 and 20 will turn the drive wheel 22 and shaft 12 with the tap 14 thereon in one direction, and pressure against the other drive wheel will turn the tap 14 in the opposite direction.

As shown in Fig. 1, the tap 14 will be driven into the article to be tapped by the frictional drive wheel 22 being pressed against the frictional drive wheel 19, the large pulley 18 turning said frictional drive wheels and tap until the bore is of the required depth, at which point the article is moved in the opposite direction, thereby pulling shaft 12 and drive wheel 22 in said opposite direction and against the drive wheel 20, which is mounted on the small pulley 17, thereby rapidly turning the tap 14 out of the bore. This is the preferred arrangement of said pulleys and frictional drive wheels. They may be adapted however by different combinations of sizes and arrangements for different forms of work. Thus, for example, in Fig. 4 the larger drive wheel 19 is combined with the smaller pulley 17 and the smaller frictional drive wheel 20 is combined with the larger pulley 18. Any combination of these four wheels as to size or arrangement of the same for use will not depart from my invention.

One of the simplest yet most important parts of the improvement in this invention is the placing of the single belt 24 around both the pulleys 17 and 18, said pulleys being always placed in line so as to receive said belt. This arrangement of the belt 24 around both the pulleys causes the two pulleys and frictional drive wheels 19 and 20 to turn simultaneously in either direction, thus the pressure of the frictional drive wheel 22 against the periphery of the frictional portion 23 of one of said drive wheels 19 or 20 will turn said frictional drive wheel 22 in one direction, whereas the pressure against the periphery of the opposite drive wheel will turn it in the opposite direction, an exceedingly simple and convenient arrangement which is at the same time positive and durable.

A guide to regulate the depth of the movement of the tap 14 is provided which consists of a supporting bracket 25 having the double arms 26 extending up therefrom, in which the shaft 27 of the guard 28 is keyed. An arm 29 is projected up from the adjacent journal 11 through which the shaft 27 slidably extends to guide the same and keep it in perfect alinement.

It is now apparent that the plate or other article to be tapped may be pressed against the end of the tap 14, thereby pressing the drive wheel friction 22 against the drive wheel 19, as shown in Fig. 3, thereby rotating the shaft 12 and the tap 14. As soon as the thread is cut to the guide 28, the article is pulled in the opposite direction, thereby pulling the drive wheel 22 against the opposite drive wheel 20 and causing the reverse rotation of the shaft 12 and tap 14, thereby unscrewing the tap 14 from the threaded aperture. As soon as the pressure is released from the frictional drive wheel 22, the continued rotation of the drive wheels 19 and 20 causes said friction drive wheel 22 to automatically move away therefrom into the space between the drive wheels 19 and 20, where it stands ready for action in either direction.

The utter simplicity of this machine drive adds greatly to its ease of operation since there is no clutch mechanism or other complicated devices to get out of order. The frictional portions 23 of the drive wheels 19 and 20 when made of paper board or similar durable frictional material wear for a long time and are then easily replaceable by simply removing the plate 21 and the pulleys 17 and 18 and nuts 17'.

I claim as new:

1. A drive for machine tools comprising a slidably and rotatively mounted shaft, a frictional drive wheel attached to said shaft to move therewith, a pair of spaced frictional drive wheels one each side of said frictional drive wheel on said slidably and rotatively mounted shaft to turn the same, each of said pair of spaced frictional drive wheels attached to suitably mounted parallel shafts, pulleys on said shaft in line with one another, and a single belt to turn said pulleys and pair of drive wheels to thereby turn said frictional drive wheel on said slidably and rotatively mounted shaft in opposite directions by the sliding of said shaft.

2. In a drive for machine tools, a first shaft rotatively and slidably supported in suitable journals, two shafts supported at right angles to said first shaft a spaced distance apart, a driving pulley on each of said two shafts and a single driving belt for both pulleys, frictional drive wheels on said two shafts one on each shaft a spaced distance apart and turned by said pulleys, and a third frictional drive wheel on said first shaft extending into the spaced opening between said spaced frictional drive wheels to frictionally contact one or the other of said drive wheels by the endwise movement of said first shaft.

3. A drive for machine tools comprising a frame having two journals thereon in spaced relation, a shaft slidably and rotatively mounted in said journals, a frictional drive wheel on said shaft between said journals, a pair of spaced shafts on said frame extending at right angles from said slidably and rotatively mounted shaft, suitable driving pulleys revolubly mounted in line with one another on said pair of shafts, and a frictional drive wheel on each of said driving pulleys in spaced relation to one another and on each side of said frictional drive wheel on said slidably and rotatively mounted shaft to turn the same.

4. A drive for machine tools comprising a frame having two journals thereon in spaced relation, a shaft slidably and rotatively mounted in said journals, a frictional drive wheel on said shaft between said journals, a pair of spaced shafts on said frame extending at right angles from said slidably and rotatively mounted shaft, pulleys in line on said pair of shafts for driving said machine having extended hubs, and a frictional drive wheel on each of said extended hubs in spaced relation to one another and on each side of said frictional drive wheel on said slidably and rotatively mounted shaft to frictionally contact therewith when said rotatively and slidably mounted shaft is moved endwise in either direction.

In testimony whereof I have affixed my signature in the presence of two witnesses.

JOHN EMIL JOHNSON.

Witnesses:
H. A. SANDBERG,
HAROLD FORSBERG.